Figure 1:
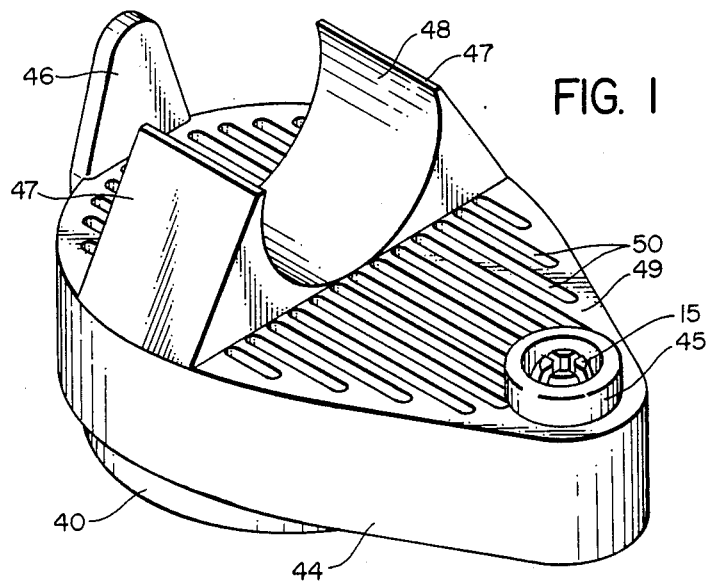

United States Patent [19]

Hood

[11] Patent Number: 4,759,093
[45] Date of Patent: Jul. 26, 1988

[54] APPARATUS FOR CLEANING A RECORD DISC

[75] Inventor: Oliver S. Hood, Ballsbridge, Ireland

[73] Assignee: Ryan Plastics Ireland, Ltd., Waterford, Ireland

[21] Appl. No.: 839,690

[22] Filed: Mar. 14, 1986

[30] Foreign Application Priority Data

Apr. 12, 1985 [IE] Ireland ............................ 934/85

[51] Int. Cl.⁴ .............................................. G11B 3/58
[52] U.S. Cl. ......................................... 15/246; 15/28; 15/97 R; 369/72
[58] Field of Search ................. 15/97 R, 210 R, 21 R, 15/246, 28; 369/72; 360/137; 134/6

[56] References Cited

U.S. PATENT DOCUMENTS

| 4,166,626 | 9/1979 | Sandor et al. | |
|---|---|---|---|
| 4,486,916 | 12/1984 | Allsop | 15/246 |
| 4,556,433 | 12/1985 | Clausen | 15/97 R X |
| 4,561,142 | 12/1985 | Mischenko et al. | |
| 4,662,025 | 5/1987 | Fritsch | 15/246 |

FOREIGN PATENT DOCUMENTS

| 895177 | 3/1983 | Belgium . |
| 896398 | 4/1983 | Belgium . |
| 2922397 | 12/1980 | Fed. Rep. of Germany . |
| 2923150 | 12/1980 | Fed. Rep. of Germany . |
| 2066998A | 11/1980 | United Kingdom . |
| 2157877A | 10/1985 | United Kingdom . |

Primary Examiner—Edward L. Roberts
Attorney, Agent, or Firm—Hughes & Cassidy

[57] ABSTRACT

A cleaning apparatus for a record disc comprises a support member having a top side and a bottom side. Locating means is provided for locating the support member relative to the center of a record disc. A knob is mounted on the top side of the support member for rotation about an axis offset from the location means whereby the support member may be manually rotated about the center of the record disc. A holder for a cleaning pad is mounted on the bottom side of the support member also for rotation about an axis offset from the locating means. A drive mechanism comprising a step-up gear is provided to couple the knob and the pad holder together such that rotation of the knob relative to the support member causes rotation of the pad holder relative to the support member. The knob is hollow and the drive mechanism comprises a circular set of teeth arranged around the internal periphery of the knob coaxially with the axis of rotation of the knob, and a gear wheel fixed relative to the pad holder coaxially with the axis of rotation of the pad holder, the gear wheel being driven by the teeth on the internal periphery of the knob. The cleaning pad has a circular cleaning portion which in use imparts a generally radially cleaning action on the record disc.

21 Claims, 4 Drawing Sheets

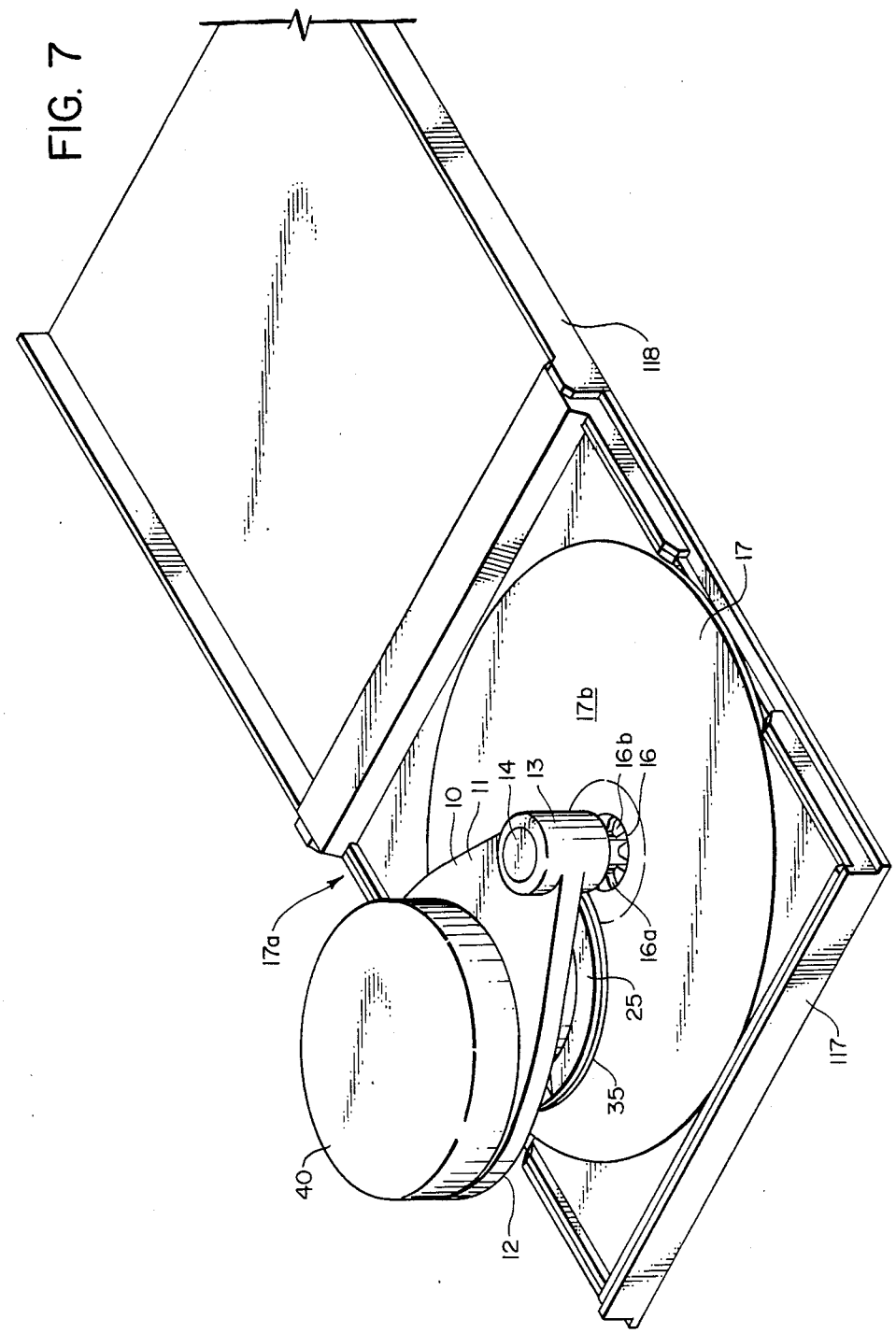

APPARATUS FOR CLEANING A RECORD DISC

This invention relates to an apparatus for cleaning a record disc, in particular but not exclusively a record disc of the kind known as a "compact disc".

European Patent Application No. 82 543A discloses a cleaning apparatus for a record disc comprising a support member having a top side and a bottom side, means for locating the support member relative to the centre of a record disc, a knob mounted on the top side of the support member for rotation about an axis offset from the locating means whereby the support member may be manually rotated about the centre of the disc, and a holder for a cleaning pad mounted on the bottom side of the support member.

However, in that specification the cleaning pad holder is fixed relative to the support member, so that the cleaning pad which is circular, maintains the same orientation relative to the record grooves during rotation of the apparatus.

This means that the innermost grooves and the outermost grooves are cleaned by the same relatively small inner and outer segments respectively of the cleaning pad, whereas the centre grooves are cleaned by the full diameter of the pad. In other words, the length of pad surface effective to clean the grooves is a function of the groove position, being greatest for the centre grooves and least for the inner and outer grooves. Thus the inner and outer pad segments become contaminated more rapidly than the centre part.

Accordingly, it is an object of the present invention to provide an improved cleaning apparatus which provides a more even use of the cleaning surface of the pad.

This is achieved according to the invention by providing that the cleaning pad holder is also mounted for rotation relative to the support member about an axis offset from the locating means, and a drive mechanism is provided which is operative upon manual rotation of the support member about the centre of the disc by the knob to cause rotation of the pad holder relative to the support member.

For the cleaning of compact discs, it is desirable that the cleaning action be generally radial rather than orbital, since any particles of grit or dirt which may be present are then most likely to be swept in a generally radial direction by the apparatus. Thus, any scratches caused by such particals are also likely to be radial. This is important, as radial scratches are less likely to affect the reading mechanism of the disc than orbital scratches.

Accordingly, for compact discs it is preferred that the cleaning pad has an effective cleaning area which is annular. By this means, provided that the inside diameter of the annular cleaning area is greater than the width of the recorded tracks, all tracks will be cleaned in a direction which is at least generally radial.

The drive mechanism may comprise means coupling the knob and pad holder together, such that rotation of the knob relative to the support member, which occurs during manual rotation of the apparatus by the knob, causes rotation of the pad holder relative to the support member. However, alternative drive mechanisms are possible, as will be described hereinafter.

Preferably, the drive mechanism comprises a step-up gear whereby the pad holder rotates substantially faster than the knob relative to the support member.

In the preferred embodiment of the invention the knob is hollow, and the drive mechanism comprises a circular set of teeth arranged around the internal periphery of the knob coaxially with the axis of rotation of the knob, and a gear wheel fixed relative to the pad holder coaxially with the axis of rotation of the pad holder, the gear wheel being driven by the teeth on the internal periphery of the knob.

Figure 2:
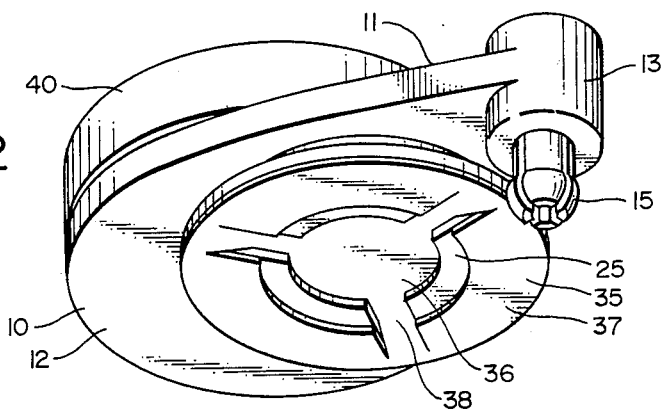
Figure 3:
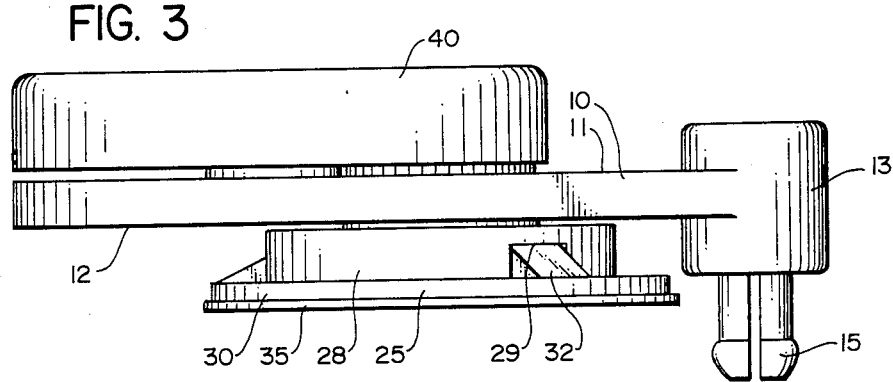
Figure 4:
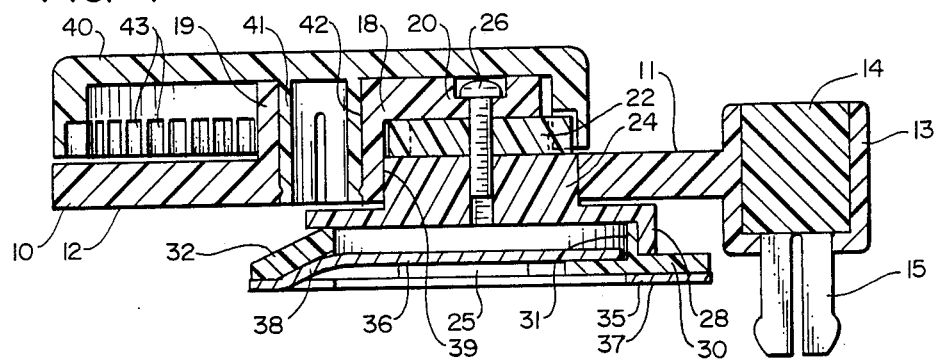
Figure 5:
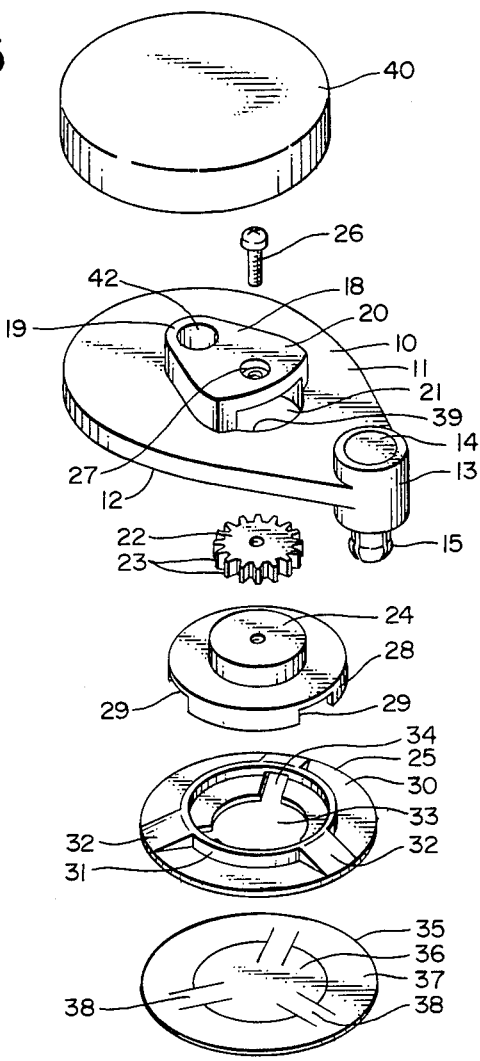
Figure 6:
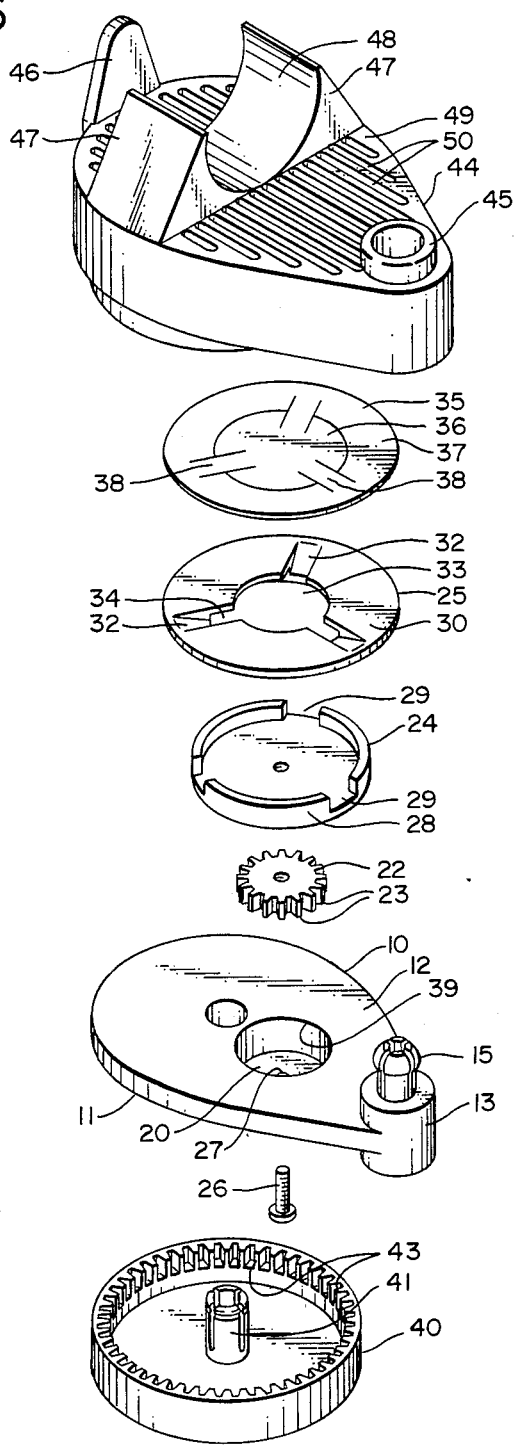

An embodiment of the invention will now be described, by way of example only, with reference to the accompanying drawings, wherein:

FIG. 1 is a top perspective view of a compact disc cleaning apparatus according to the invention, the cleaning apparatus being shown accommodated in a removable protective housing, FIG. 2 is a bottom perspective view of the cleaning apparatus removed from its housing, FIG. 3 is a side view of the cleaning apparatus of FIG. 2, FIG. 4 is a cross-sectional view of the cleaning apparatus of FIG. 2, FIG. 5 is a top perspective exploded view of the cleaning apparatus, FIG. 6 is a bottom perspective exploded view of the cleaning apparatus including its removable housing, and FIG. 7 shows the cleaning apparatus according to the invention in use.

Referring to the drawings, a cleaning apparatus for a compact disc 17 (FIG. 7) comprises a pear-shaped support plate 10 having a top surface 11 and a bottom surface 12. At the narrow end the plate 10 has a hollow boss 13 which rotatably accommodates a spindle 14. The lower end of the spindle 14 comprises four resilient segments 15 which are dimensioned to permit the spindle 14 to be inserted into the centre aperture 16 of a compact disc case 17a (FIG. 7), the segments 15 bearing resiliently outwardly against the inside edge of the centre aperture 16. The axis of rotation of the spindle 14 is perpendicular to the plate 10, whereby the latter may be rotated about the centre of the disc 17 in a manner to be described.

The top surface 11 of the plate 10 has a housing 18 of which a part 19 remote from the spindle 14 is solid and a part 20 nearest the spindle 14 is hollow, the hollow part 20 having a lateral aperture 21 opening into the top surface 11 of the plate 10 where it faces the spindle 14. The hollow part 20 of the housing 18 accommodates a gear wheel 22 whose teeth 23 are exposed at and project slightly beyond the housing 18 at the lateral aperture 21. The gear wheel is rotatably retained in the housing 18 by a bolt 26 which passes with slight tolerance through an aperture 27 in the top of the hollow part 20 and onto which the gear wheel 22 is threaded in the manner of a nut.

The gear wheel 22 is non-rotatably secured to a cleaning pad holder mounted on the underside of the support plate 10, the cleaning pad holder being formed in two parts, an upper part 24 and a lower part 25. The upper part 24 of the cleaning pad holder 24/25, which passes with slight clearance through a circular aperture 39 in the plate 10, is threaded on the bolt 26 and securely fixed relative to the gear wheel 22, either by adhesive or simply by tightening up against the underside of the gear wheel 22. The lower part 25 of the cleaning pad holder 24/25 clips removably into the upper part 24. Thus the cleaning pad holder 24/25 as a whole is secured to the gear wheel 22 for rotation therewith about an axis substantially parallel to but laterally offset from the axis of the spindle 14. A low friction washer (not show) may be inserted between the gear wheel 22 and the top of the hollow housing part 20 to ensure ease of rotation, and it should not be possible for the part 24 or the gear wheel 22 to unscrew from the bolt 26 during rotation of the gear wheel.

The upper part 24 of the cleaning pad holder 24/25 includes a shallow cylinder 28 open at the bottom and having three equiangularly spaced apertures 29 in its circular side wall. The lower part 25 of the cleaning pad holder 24/25 includes a flat annular plate 30 having an upwardly facing cylindrical wall 31 of lesser diameter concentric therewith. Externally of the wall 31 the part 25 has three equiangularly spaced radial ramp-like formations 32, and internally of the wall 31 the part 25 has a central aperture 33 in the plate 30 and three equiangularly spaced slots 34 extending radially from the aperture 33. The wall 31 of the lower part 25 fits snugly within the side wall of the cylinder 28 of the upper part 24, the formations 32 snapping into position in the apertures 29.

In use a cleaning pad 35 is removably mounted on the lower surface of the lower part 25 of the cleaning pad holder 24/25. The cleaning pad 35 comprises a disc of fibrous material of substantially the same diameter as the plate 30, a concentric inner portion 36 of the pad being partially severed from the surrounding outer annular portion 37 but being joined thereto by three equiangular strips of material 38 which permit the inner portion 36 to be displaced axially relative to the outer portion 37. The diameter of the inner portion 36 of the pad 35 is greater than that of the central aperture 33 in the plate 30, which permits the cleaning pad 35 to be attached to the lower part 25 of the cleaning pad holder 24/25 by pushing the inner portion 36 through the aperture 33 into the space behind the plate 30 and within the wall 31, the strips of material 38 passing through the slots 34. Thus the cleaning pad 35 is self-retaining on the cleaning pad holder 24/25, the outer annular portion 37 abutting against the annular plate 30 and the inner portion 36 being recessed below the plate 30.

A knob 40 is mounted on the top surface 11 of the support plate 10 for rotation about an axis substantially parallel to but laterally offset from the axis of the spindle 14. The knob 40 is in the form of a shallow hollow cylinder open at the bottom and has a central spindle 41. The spindle 41 is rotatably accommodated in an aperture 42 which passes through the solid part 19 of the housing 18 and into the support plate 10.

The internal periphery of the knob 40 is formed with a circular set of teeth 43 coaxial with the axis of rotation of the knob. The knob 40 fits over the housing 18 as shown, and the internal teeth 43 thereof mesh with the teeth 23 of the gear wheel 22 where the latter are exposed at the lateral aperture 21 of the housing 18. Thus, rotation of the knob 40 relative to the support plate 10 will cause rotation of the cleaning pad holder 24/25 relative to the plate 10 and, since there are many more teeth on the inside of the knob 40 than on the gear wheel 22, the arrangement comprises a step-up gear with the pad holder rotating much faster relative to the plate 10 than the knob 40.

The compact disc 17 when not in use is stored in the compact disc case 17a. The case 17a comprises a housing 117 for the disc 17, the housing 117 having a hinged lid 118 attached thereto. The housing 117 has its centre aperture 16 provided in a boss 16a having teeth 1. The compact disc 17 generally comprises an obverse side having indicia thereon, which provide details as to the titles etc. of the tracks on the disc, and a reverse or playing side 17b. Generally, for ease of identification, the obverse side is exposed to the viewer when the lid 118 is lifted. Accordingly, to clean the playing side 1, it is necessary to invert the disc 17 so that the playing side 17b is uppermost in the housing 117. The boss 16a engages with the hole of disc 17 thereby preventing rotation of the disc 17 in the housing 117.

In use, FIG. 7, appropriate cleaning fluid is applied to the cleaning pad 35 and the cleaning apparatus is placed on a compact disc 17 with the spindle segments 15 inserted so as to engage with the teeth 16b and the pad 35 in contact with the playing side 17b. Next, the knob 40 is manually gripped and the plate 10 rotated around the spindle 14. It will be appreciated that during this operation, although the knob 40 does not rotate relative to the user, it does rotate relative to the support plate 10, making one rotation relative to the plate 10 for each rotation of the plate 10 about the spindle 14. Accordingly, via the teeth 43 on the knob 40 and the gear wheel 22, the cleaning pad holder 24/25 and hence the cleaning pad 35 will rotate at a substantially faster rate to clean the playing side 17b.

Since only the outer annular portion 37 of the cleaning pad 35 is in contact with the playing side 17b, being pressed against the side 17b by the annular plate 30, there is imparted a generally radial cleaning action by the cleaning pad 35 on the playing side 17b. As previously mentioned, this cleaning action has been found to be particularly effective for compact discs.

It will be appreciated that a plurality of cleaning pads 35 may be retained simultaneously on the cleaning pad holder 24/25. Thus, the exposed cleaning pad may be quickly and easily removed when it has become sufficiently contaminated to warrant the use of a new cleaning pad. It may be desirable to interpose between each of the cleaning pads a fluid impervous membrane so as to enable only the cleaning pad which is currently in use to be exposed to the application of the cleaning fluid.

The apparatus described above has a protective housing 44 (FIGS. 1 and 6) in whch the apparatus may be kept while not in use. The housing 44 is essentially pear-shaped corresponding to the shape corresponding to the shape of the support plate 10, is open on one side (not shown) to receive the plate 10 snugly therein and has a base 49 having apertures 50 therein. The apertures 50 provide ventilation holes to enable the cleaning pad 35 to dry off with the apparatus retained in the housing 44. The apparatus is retained in the housing 44 by the spindle segments 15 snapping into a boss 45 at the corresponding end of the housing 44. The housing 44 has a flat plate 46 at the opposite end to the boss 45, the plate 46 permitting the apparatus in the housing to be stood on one end for storage (FIG. 1). Finally, the base 49 supports a pair of flanges 47 defining a U-shaped recess 48 in which a bottle of cleaning fluid may be kept.

In an alternative embodiment of the invention, the pad holder 24/25 may be driven from the spindle 14 rather than from the knob 40. Thus, if the spindle 14 is freely rotatable in the boss 15, and is frictionally or otherwise held against rotation in the centre aperture 16 of the housing 117, a step-up gear mechanism may be provided between the spindle 14 and the pad holder 24/25 to achieve the same result of high speed rotation of the latter when the support plate 10 is rotated by the knob 40. In such case the knob 40 is not connected to the pad holder 24/25, but is freely rotatable relative to the support plate 10.

I claim:

1. A cleaning apparatus for a record disc, comprising a support member having a top side and a bottom side, means for locating the support member relative to a centre of the record disc, a knob mounted on the top side of the support member for rotation about an axis offset from the locating means whereby the support member may be manually rotated about the centre of the disc, a cleaning member mounted on the bottom side of the support member, the cleaning member also being mounted for rotation relative to the support member about an axis offset from the locating means, and a drive mechanism operative upon manual rotation of the support member about the centre of the disc by the knob to cause rotation of the pad holder relative to the support member.

2. A cleaning apparatus according to claim 1, wherein the drive mechanism comprises means coupling the knob and cleaning member together.

3. A cleaning apparatus according to claim 2, wherein the knob is hollow, and the drive mechanism comprises a circular set of teeth arranged around an internal periphery of the knob coaxially with the axis of rotation of the knob, and a gear wheel fixed relative to the cleaning member with the axis of rotation of the cleaning member, the gear wheel being driven by the teeth on the internal periphery of the knob.

4. A cleaning apparatus as claimed in claim 3, wherein the cleaning member comprises a lower part attachable to an upper part, the upper part being secured to the gear wheel for rotation therewith.

5. A cleaning apparatus according to claim 1, wherein the drive mechanism comprises a speed increasing gear transmission whereby the cleaning member rotates relative to the support member substantially faster than the knob rotates relative to the support member.

6. A cleaning apparatus as claimed in claim 1, wherein the locating means comprises a hollow boss at one end of the support member, the boss rotatably accommodating a spindle, and the lower end of the spindle comprising a plurality of resilient segments adapted to permit the spindle to be inserted into the centre aperture of a compact disc case.

7. A cleaning apparatus as claimed in claim 1, wherein said cleaning member comprises a cleaning pad and a cleaning pad holder, with the cleaning pad being self retaining on the cleaning pad holder.

8. A cleaning apparatus as claimed in claim 1, wherein the cleaning member has a cleaning surface which has an effective cleaning area which is annular, such that a generally radial cleaning action is imparted by the cleaning surface on the compact disc.

9. An apparatus adapted to clean an object, such as encoded disc, said object having an middle portion and a peripheral portion, where the cleaning is acccomplished in a wiping path having a substantial radial component between the middle portion and the peripheral portion, said apparatus comprising:

a. a locating and mounting means which defines a first vertically aligned centre axis which is adapted to locate said object at a stationary cleaning location centered on said first axis, b. a cleaning means having a second generally vertically aligned cleaning axis, said cleaning means being adapted to be positioned at said cleaning location, in a manner that said second cleaning axis is spaced from said first axis, and said cleaning means being movable in a circumferential path around said first axis, said cleaning means comprising a cleaning member having a cleaning surface which is centered on said second axis, at least said cleaning member being rotatable about said second axis, c. handle means operatively connected to said cleaning means and arranged to be moved manually on a generally horizontal path around said first axis to move said cleaning means on said circumferential path around said first axis, d. drive transmission means which is operatively connected to said cleaning member to rotate said cleaning member about said second axis and which is arranged to be powered from movement from said handle means relative to said locating and mounting means along said horizontal path around said first axis, in a manner that with said object placed at said cleaning location, and with said cleaning means positioned at said cleaning location, the handle can be moved on said horizontal path to move said cleaning means along said circumferential path and to cause rotation of at least said cleaning member about said second axis, to in turn cause said annular cleaning surface to travel on said wiping path as the cleaning means travels progressively around said first axis.

10. The apparatus as recited in claim 9, wherein said handle means is rotatably mounted relative to said cleaning means.

11. The apparatus as recited in claim 10, wherein said drive transmission comprises an operative drive transmission between said handle means and said cleaning member in a manner that rotation of said handle means relative to said cleaning means causes rotation of said cleaning member.

12. The apparatus as recited in claim 9, wherein said cleaning means comprises a support member mounted for rotation around said first axis and said cleaning member is rotatably mounted about said second axis to said support member.

13. The apparatus as recited in claim 12, wherein said handle means is rotatably mounted to said support member.

14. The apparatus as recited in claim 13, wherein said handle means is rotatably mounted to said support member about a third axis which is laterally offset from said second axis.

15. The apparatus as recited in claim 14, wherein said drive transmission means is operatively connected between said handle means and said cleaning member in a manner that rotation of said handle means relative to said support member causes said cleaning member to rotate about said second axis.

16. The apparatus as recited in claim 13, wherein said drive transmission means is operatively connected between said handle means and said cleaning member in a manner that rotation of said handle means relative to said support member causes said cleaning member to rotate about said second axis.

17. The apparatus as recited in claim 16, wherein said drive transmission means comprises a first gear means fixably connected to said handle means, and said cleaning member has a second gear means fixably connected thereto, with said first and second gear means having an operative connection in a manner that rotation of said handle means causes rotation of said cleaning member.

18. The apparatus as recited in claim 17, wherein said first gear means and said second gear means have a direct operative connection.

19. The apparatus as recited in claim 16, wherein said cleaning member has an annular cleaning surface such that a generally radial cleaning action is imparted on said object.

20. The apparatus as recited in claim 12, wherein said cleaning member has an annular cleaning surface such that a generally radial cleaning action is imparted on said object.

21. The apparatus as recited in claim 9, wherein said cleaning member has an annual cleaning surface such that a generally radial cleaningaction is imparted on said object.

* * * * *